June 27, 1933.  C. B. MIRICK  1,915,328
RADIO DIRECTION FINDING SYSTEM
Filed April 17, 1929
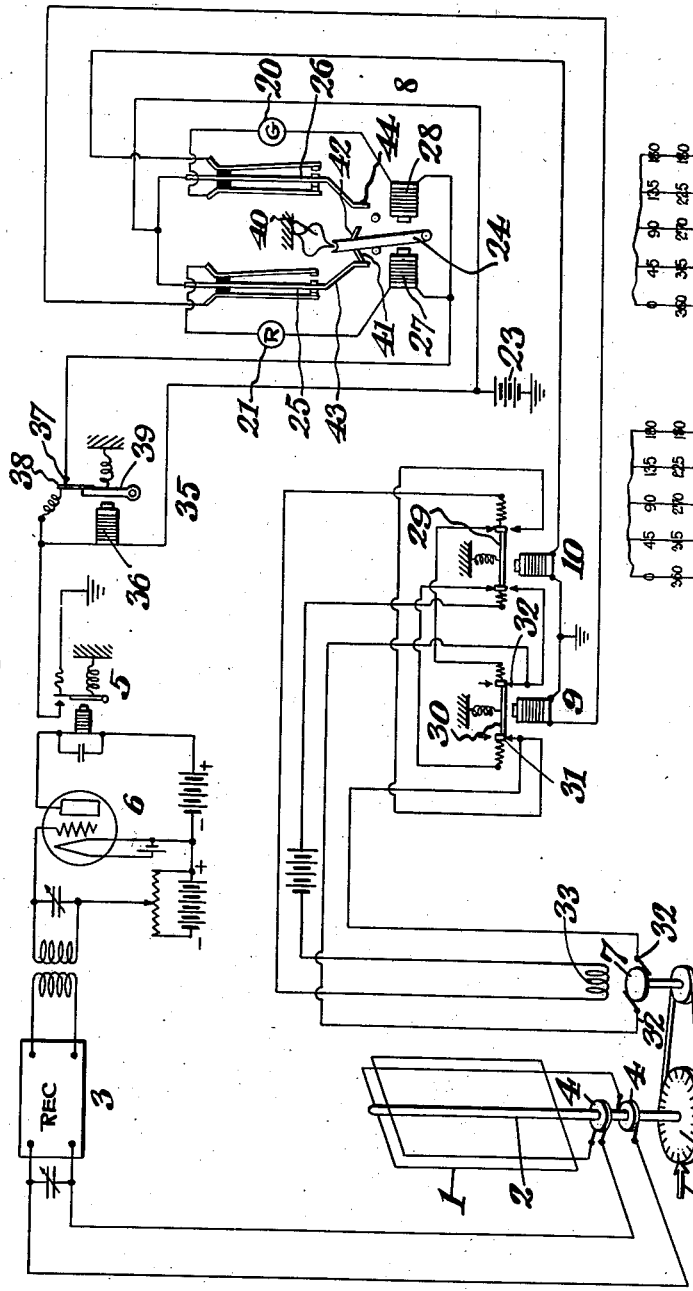
Inventor
Carlos B. Mirick
by his Attorney Patented June 27, 1933

1,915,328

UNITED STATES PATENT OFFICE

CARLOS B. MIRICK, OF WASHINGTON, DISTRICT OF COLUMBIA, ASSIGNOR TO NATIONAL ELECTRICAL SUPPLY COMPANY, OF WASHINGTON, DISTRICT OF COLUMBIA, A CORPORATION OF VIRGINIA

RADIO DIRECTION FINDING SYSTEM

Application filed April 17, 1929. Serial No. 355,855.

My invention relates broadly to radio direction finding systems and more particularly to a system of automatic radio directional reception.

One of the objects of my invention is to provide a radio direction finding system in which the direction finder loop or coil is automatically set in a predetermined position with respect to the direction of the distant transmitting station for giving an accurate indication of the bearing of the transmitter.

Another object of my invention is to provide a unidirectional system of reception which is automatic in its operation, the direction finder coil being mechanically set with respect to the direction of the distant transmitting station or beacon upon receipt of signals from the transmitting station or beacon.

A further object of my invention is to provide a combined visual and graphical system of automatic radio direction finding eliminating error which may arise from the manual setting of the direction finder by the usual aural observation of the received signal energy.

A still further object of my invention is to provide a system of relays automatically controlled by incoming signaling energy incident upon the direction finder coil for automatically setting the direction finder coil in a predetermined position with respect to the distant transmitter or beacon and recording both graphically and visually the position of the distant transmitter or beacon.

Still another object of my invention resides in the method of direction finding in which the pick-up coil is continuously rotated and automatically arrested in its movement upon receipt of incoming signaling energy and brought to a predetermined position with respect to the distant transmitter for both visually and graphically indicating the position of the distant transmitter.

My invention also has for its object the provision of means whereby a radio goniometer may be automatically oriented for determining absolute direction of signals without the aid of an operator.

Other and further objects of my invention reside in the circuit arrangement for an automatic direction finder system as set forth more fully in the specification hereinafter following by reference to the accompanying drawing in which:

Figure 1 diagrammatically illustrates the circuit arrangements and mechanical relationship of parts in my automatic system of direction finding; and Figs. 2 and 3 show specimens of graphic records which may be taken in the automatic direction finder system of my invention.

My invention provides means whereby a radio direction finder will automatically set itself on a distant transmitting station or radio beacon and will give both visual and graphically recorded indication of the direction of the said transmitting station or beacon. The system of my invention includes a rotatable coil or loop 1 which may be the usual rotatable loop of a radio direction finder which collects energy from a distant transmitter in varying amounts, depending upon its orientation, about shaft 2, or it may be the rotatable member of a radio goniometer such as is used in the Bellini Tosi system of direction finding. A radio receiver 3 connects to rotatable coil 1 through suitable collector rings 4 and is tuned in the usual manner to resonance with the distant radio transmitter. A radio operated switch consisting of relay 5 and blocked grid electron tube system 6 is so connected to receiver 3 that the reception of an incoming signal from a distant transmitter, through loop 1 and receiver 3 will cause relay 5 to close. The rotation of the loop 1 on shaft 2 is controlled by means of a reversible motor 7 suitably connected or geared to shaft 2 as to cause loop 1 to rotate in either direction as controlled by a system of relays 35, 8, 9 and 10 which will be hereinafter described. Rotatable shaft 2 carries graduated dial and pointer 12 having a movement corresponding to the movement of loop 1 so as to indicate the position of loop 1 at any time. The shaft 2 carries a suitably cut cam 14 which moves spring pressed plunger 15 to shift a stylus 16 through suitable mechanism so as to graphically record the position of rotatable loop 1 on a moving chart 17. The chart 17 is suitably advanced by a reel and web mechanism indicated at 18.

I have shown control relays at 5 and 35 and reversing relays at 8, 9 and 10 for controlling the automatic functioning of the apparatus. The relay 35 has a control winding 36 and a contact 37 closed by the arm 38 of relay armature 39. The contact arrangement for relay 35 is reversed with respect to the contact arrangement of relay 5 so that when the contact of relay 5 is closed the contact of relay 35 is open as will appear hereinafter. The relay 8 includes a rockable two position armature 24 movable to either of two positions for closing sets of contacts 25 or 26 under control of electromagnets 27 and 28, respectively. That is, closing of relay 5 completes a circuit from battery 23 through electromagnet 36, moving armature 39 to a position opening contacts 37–38. When the energy is no longer being received or when the energy drops off below an amplitude sufficient to operate relay 5 the contacts of relay 5 open, thereby permitting a closing of the contacts 37–38 of relay 35. The relay system 8 has its armature under control of spring member 40 with pins 41 and 42 projecting from the armature and forming abutments for the spring members 43 and 44 of the contact systems 25 and 26. The relay armature 24 is moved positively from one limiting position to another limiting position as each initiating impulse is given to the magnets 27 and 28 to correspondingly control the energization of the windings of reversing relays 9 and 10. By energizing the reversing relay 9 armature 30 is moved and the lower contacts 31 closed for connecting the motor armature terminals 32 in predetermined relation to the motor field winding 33. The relay 8 remains set in one limiting position until an initiating impulse is again supplied to the solenoids 27–28. As the signal comes in on the loop collector 1 the armature 5 closes and remains closed so long as the signal persists. Relay 8 is actuated to that position determined by the original setting of relay 8, and by moving into a selected position operates the reversing switches through solenoids 9 and 10. When relay 5 closes, relay 35 opens thereby isolating relay 8 before relay 8 can kick back. This prevents buzzer action at relay 8. When the signal relay 5 opens, relay 35 closes, but there is no action at relay 8. Relay 8 reverses on each initial closing of relay 5.

In operation when no signal is received loop 1, driven by motor 7 is caused to rotate slowly in one direction and stylus 16 travels continuously from one side of the chart to the other. Assume that a continuous or key locked signal is transmitted by distant beacon station and collected by loop 1 and receiver 3:

Relay 5 closes and remains closed;
Relay 8 changes from one side to the other and remains there.

The direction of rotation of loop 1 is thus reversed by action of relays 9 and 10 on motor 7 and continues in this reverse direction until a "minimum" is reached, indicating the direction of the beacon. As loop 1 swings past this "minimum", relay 5 opens as the signal dies out and re-closes as it comes in again. At each re-closing of relay 5 the direction of rotation of loop 1 is reversed, causing it to swing back and forth or "hunt" about the minimum.

It may be noted that reversing switch relays 9 and 10 are cross-connected in such a way that no short circuit can result from any of the four possible positions of the relays. It may be further noted that the graphic recording device facilitates the determination of whether the distance from beacon is growing greater or less. The width of the bearing trace would widen or diminish with the width of the "minimum". To this extent the system may be considered uni-directional.

It is to be understood that the motor 7 is only one means of providing power for the operation of coil 1. The loop 1 might be driven by any other convenient source of power such as a wind driven motor on an airplane, etc. It is only necessary that the direction of rotation be controlled by the reversing switch.

The movement of armature 24 controls not only the operation of the reversing relays 9 and 10 but also the visual indicator lights 20 and 21, as well as the direction of rotation of the driving motor. The graphic record or chart is driven by clock movement or other synchronized driver at a rate related to the movement of the loop for establishing the graphic record at the receiver.

The timing of the several relays in proper sequence is essential. Relay 8 must operate after the closing of relay 5 and before relay 35 opens the circuit. Relays 9 and 10 must operate quickly when conditioned by relay 8 to effect reversal of the driving motor 7 without delay, thereby orienting the loop 1 to a plane which is normal to the direction of the transmitting station.

My invention eliminates the uncertainties existing in the aural method of reception, and eliminates the necessity of continued watch at the direction finder apparatus for a permanent record is made on the graphic chart.

While I have described my invention in certain of its preferred embodiments I desire that it be understood that modifications may be made and that no limitations upon my invention are intended other than are imposed by the scope of the appended claims.
What I claim as new and desire to secure by Letters Patent of the United States is as follows:

1. In a system of direction finding a loop structure, means tending to continuously rotate said loop structure, a receiving relay, automatic means operative upon receipt of signaling energy by said receiving relay for controlling the direction of rotation of said loop structure for automatically moving said loop structure in a plane related to the direction of the outlying transmitting station, means for isolating said automatic means from said receiving relay subsequent to each initial closing of said receiving relay, and electrically actuated means indicating the direction of rotation of said loop structure.

2. A system of direction finding comprising a rotatable loop structure, means tending to continuously rotate said loop structure, automatic means for controlling the direction of rotation of said means, a signal receiving circuit connected with said loop structure, a relay connected with said signal receiving circuit for operating said means for moving said loop structure in a plane normal to the direction of a distant transmitting station, means disposed between said relay and said automatic means for isolating said relay from said automatic means subsequent to each initial closing of said relay, and electrical means for indicating the direction of movement of said loop structure.

3. In a system of direction finding, a rotatable loop structure, means tending to automatically and continuously rotate said loop structure in either of two directions, a receiving circuit connected with said loop structure, a relay connected with said receiving circuit, circuits controlled by said relay for automatically reversing the direction of rotation of said first mentioned means under control of incoming signaling energy for moving said loop structure into a plane normal to the direction of a transmitting station, means disposed between said relay and said circuits for isolating said circuits from said relay subsequent to each initial closing of said relay, and signal devices actuated by the movement of said loop structure in either direction.

4. In a system of direction finding, a rotatable loop structure, automatic means tending to continuously rotate said loop structure, means for controlling the direction of the rotation of said loop structure, a signal receiving circuit connected with said loop structure and relay mechanism controlled by said signal receiving circuit for actuating said automatic means for moving said loop structure to a plane definitely related to the direction of the transmitting station, means disposed between said automatic means and said relay mechanism for isolating said automatic means from said relay mechanism subsequent to each initial closing operation of said relay mechanism, and signal indicators simultaneously operated by said relay mechanism for visually indicating the direction of rotation of said loop structure.

5. In a system of direction finding, a rotatable loop structure, means tending to automatically and continuously rotate said loop structure, a signal receiving circuit connected with said loop structure, relay mechanism controlled by said signal receiving circuit, switching means actuated by said relay mechanism for governing the direction of rotation of said automatic means for moving said loop structure in a plane having predetermined relation to the direction of a transmitting station, and an auxiliary relay disposed between said switch means and said relay mechanism for isolating said switching means from said relay mechanism subsequent to each initial closing operation of said relay mechanism, and signal lights controlled by said switching means for indicating the direction of rotation of said loop structure.

6. In a system of direction finding, a rotatable loop structure, a signal receiving circuit connected with said loop structure, relay mechanism controlled by said signal receiving circuit, means tending to continuously and automatically rotate said loop structure, switching means for controlling the direction of rotation of said means, said switching means being actuated in accordance with the operation of said relay mechanism upon receipt of signaling energy for moving said loop structure to a plane having direct relation with respect to the direction of a transmitting station, means connected between said relay mechanism and said switching means for isolating said switching means from said relay mechanism subsequent to each initial closing operation of said relay mechanism, and indicators in circuit with said switching means for visually indicating the direction of rotation of said loop structure.

7. In a system of direction finding, a rotatable loop structure, means tending to automatically and continuously rotate said loop structure in either of two directions, a signal receiving circuit connected with said loop structure, a relay connected with said signal receiving circuit, switching mechanism controlled by said relay for automatically reversing the direction of said rotation of said loop structure for moving said loop structure to a position directly related to the direction of a transmitting station, an auxiliary relay connected between the aforesaid relay and said switching mechanism for isolating said switching mechanism from said relay subsequent to each initial closing operation of said relay, and signal indicators operated by said switching mechanism in either of two positions thereof for indicating the direction of rotation of said loop structure.

8. In a system of direction finding, a rotatable loop, a signal receiving circuit connected with said loop, a motor for effecting angular movement of said loop, a responsive device actuated by the signaling energy incident upon said loop, visual signal indicators alternately operative in accordance with changes in the direction of movement of said loop, means controllable by changes in amplitude of the received signal energy for governing the direction of angular movement of said loop and an auxiliary relay disposed between said responsive device and said means for automatically revolving said loop for isolating said means from said signal receiving circuit subsequent to each initial operation of said responsive device.

CARLOS B. MIRICK.